US008327301B2

(12) United States Patent
Cheng et al.

(10) Patent No.: US 8,327,301 B2
(45) Date of Patent: Dec. 4, 2012

(54) ROUTING METHOD FOR DOUBLE PATTERNING DESIGN

(75) Inventors: Yi-Kan Cheng, Taipei (TW); Lee-Chung Lu, Taipei (TW); Ru-Gun Liu, Hsin-Chu (TW); Chih-Ming Lai, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 224 days.

(21) Appl. No.: 12/616,956

(22) Filed: Nov. 12, 2009

(65) Prior Publication Data

US 2010/0199253 A1 Aug. 5, 2010

Related U.S. Application Data

(60) Provisional application No. 61/149,637, filed on Feb. 3, 2009.

(51) Int. Cl.
*G06F 17/50* (2006.01)
(52) U.S. Cl. .............. 716/55; 716/50; 716/51; 716/110; 716/126; 716/129; 716/130
(58) Field of Classification Search ........................ None
See application file for complete search history.

(56) References Cited

U.S. PATENT DOCUMENTS

| | | | | |
|---|---|---|---|---|
| 6,670,080 | B2* | 12/2003 | Sugita et al. ..................... | 430/5 |
| 7,785,946 | B2* | 8/2010 | Haffner et al. ................ | 438/183 |
| 7,856,613 | B1* | 12/2010 | Weling et al. ................... | 716/55 |
| 7,913,197 | B1* | 3/2011 | Kruger et al. ................... | 716/53 |
| 7,926,001 | B2* | 4/2011 | Pierrat ............................. | 716/50 |
| 2010/0115489 | A1* | 5/2010 | Song et al. ...................... | 716/19 |
| 2010/0196803 | A1* | 8/2010 | Lu et al. ............................ | 430/5 |
| 2011/0023002 | A1* | 1/2011 | Cheng et al. ................... | 716/126 |
| 2011/0119648 | A1* | 5/2011 | Chen et al. ..................... | 716/126 |

OTHER PUBLICATIONS

"Double Patterning," http://en.wikipedia.org/wiki/Double_patterning, Wikipedia, downloaded Feb. 5, 2009, pp. 1-6.

* cited by examiner

*Primary Examiner* — A. M. Thompson
(74) *Attorney, Agent, or Firm* — Slater & Matsil, L.L.P.

(57) ABSTRACT

In a method of designing a double patterning mask set, a chip is first divided into a grid that includes grid cells. A metal layer of the chip is laid out. In substantially each of the grid cells, all left-boundary patterns of the metal layer are assigned with a first indicator, and all right-boundary patterns of the metal layer are assigned with a second indicator. Starting from one of the grid cells in a row, indicator changes are propagated throughout the row. All patterns in the grid cells are transferred to the double patterning mask set. All patterns assigned with the first indicator are transferred to a first mask of the double patterning mask set, and all patterns assigned with the second indicator transferred to a second mask of the double patterning mask set.

28 Claims, 5 Drawing Sheets

ROUTING METHOD FOR DOUBLE PATTERNING DESIGN

This application claims the benefit of U.S. Provisional Application No. 61/149,637 filed on Feb. 3, 2009, entitled "Routing Method for Double Patterning Design," which application is hereby incorporated herein by reference.

TECHNICAL FIELD

This invention relates generally to integrated circuit manufacturing processes, and more particularly to using double patterning technology to reduce the lithography limits of integrated circuits, and even more particularly metal routing using the double patterning technology.

BACKGROUND

Double patterning is a technology developed for lithography to enhance the feature density. Typically, for forming features of integrated circuits on wafers, lithography technology is used, which involves applying a photo resist, and defining patterns on the photo resist. The patterns in the patterned photo resist are first defined in a lithography mask, and are defined either by the transparent portions or by the opaque portions in the lithography mask. The patterns in the patterned photo resist are then transferred to the underlying features.

With the increasing down-scaling of integrated circuits, optical proximity effect posts an increasingly greater problem. When two separate features are too close to each other, the optical proximity effect may cause the features to short to each other. To solve such a problem, double patterning technology is introduced. The features closely located are separated to two masks, with both masks used to expose the same photo resist. In each of the masks, the distances between features are increased over the distances between features in the otherwise single mask, and hence the optical proximity effect is reduced, or substantially eliminated.

When the double patterning technology is used in the formation of metal layers, which are used to route connections between integrated circuits, problems may arise, and design rules may be violated. To solve this problem, design rules may be relaxed by increasing the pitches of the metal lines. However, this defeats the purpose of using the double patterning technology, which is for laying out features tightly in order to save the chip area. An additional method is to perform additional iterations of routing to fix the hot spots that may be generated in preceding routing iterations. However, any fix to the routing may have ripple effects, and may require the re-routing in the entire chip. New methods are thus needed to improve the efficiency in the metal routing.

SUMMARY OF THE INVENTION

In accordance with one aspect of the present invention, a method of designing a double patterning mask set includes dividing the chip into a grid comprising grid cells; and laying out a metal layer of a chip. In substantially each of the grid cells, all left-boundary patterns of the metal layer are assigned with a first one of a first indicator and a second indicator, and all right boundary patterns of the metal layer are assigned with a second one of the first indicator and the second indicator. Starting from one of the grid cells in a row, indicator changes are propagated throughout the row. All patterns in the grid cells are transferred to the double patterning mask set, with all patterns assigned with the first indicator transferred to a first mask of the double patterning mask set, and all patterns assigned with the second indicator transferred to a second mask of the double patterning mask set. Other embodiments are also disclosed.

The advantageous features of the present invention include reduced design effort for solving rule violations in the metal routing involving double patterning technology. In addition, chip area usage may be further reduced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

A novel double patterning routing method, a router framework, and the resulting double patterning mask sets are presented. The variations of the embodiment are then discussed. Throughout the various views and illustrative embodiments, like reference numbers are used to designate like elements.

Figure 1:
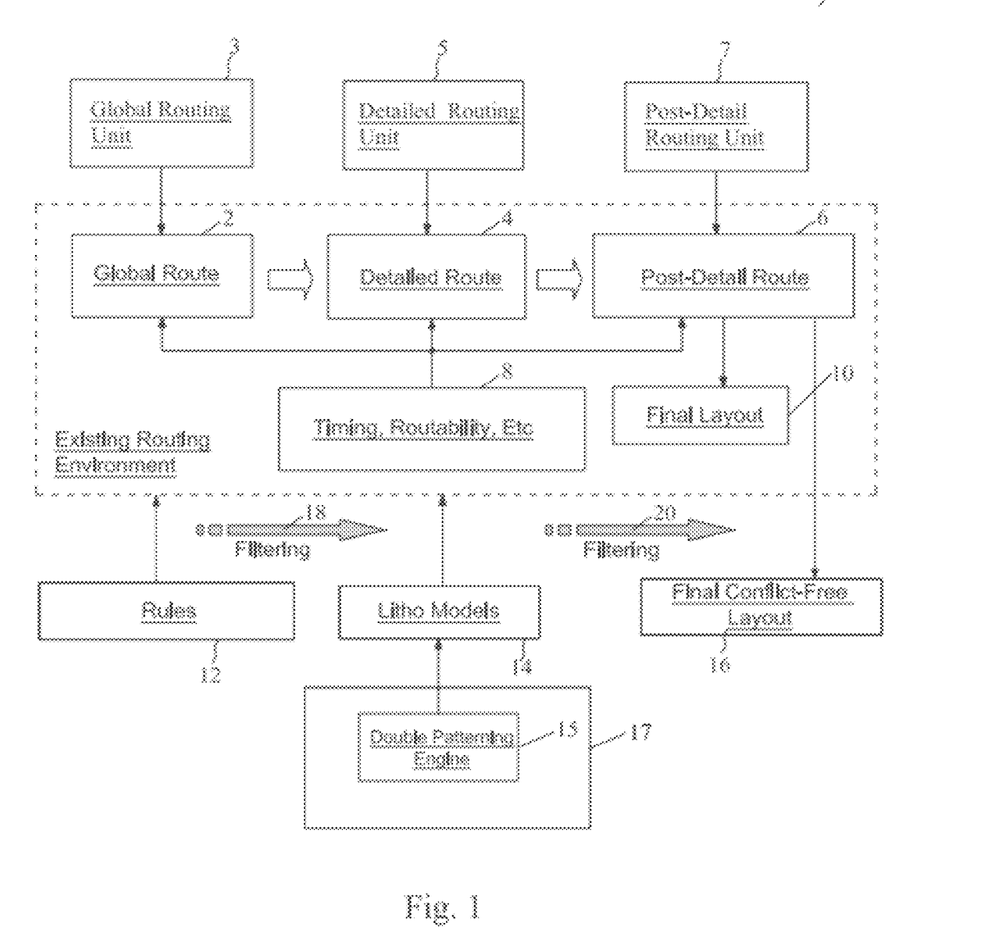
FIG. 1 illustrates a router framework including lithography models for a double patterning engine.

FIG. 1 schematically illustrates a block diagram of router framework 1, which includes double patterning lithography models (Litho models 14). Router framework 1 may perform three types of routing tasks, global route (step 2), detailed route (step 4), and post-detail route (step 6), which may be performed by global routing unit 3, detailed routing unit 5, and post-detail routing unit 7, respectively. In each of global route 2, detailed route 4, and post-detail route 6, router framework 1 needs to determine the routability for routing the connection between the nodes of integrated circuits, and determine the performance issue, such as the timing of the routed metal lines. In global route 2, router framework 1 performs a coarse routing without considering detailed design rules, wherein the resulting routes may simply take the shortest paths. In the detailed route, more information, such as design rules 12, is used. Accordingly, the resulting routing is more detailed, for example, to the level that the metal layers of the metal lines are also determined. In the post-detail route step 6, the routing results obtained in detailed route 4 are inspected using design rules, and hot spots (circuits having rule violations) are fixed. Any rule violation that cannot be fixed in the detailed routing is also fixed by the post-detail route step, during which the related routes are ripped up (destroyed), and re-routing is performed. A final layout (block 10) is then generated.

Router framework 1 filters the rule violations in a step-by-step style, as indicated by arrows 18 and 20. Generally, as illustrated by arrows 18, design rules may be used to filter (fix) general (non-double-patterning) design rule violations. Next, as symbolized by arrow 20, router framework 1 calls double patterning engine 15, which uses litho(graphy) models (block 14) to find and fix any double patterning related rule violation (local violations), and to obtain timing and routability information, which are used in routing decisions so that the resulting layout will be conflict free (block 16). Advantageously, with double patterning engine 15 being able to fix double patterning related design rule violations, the rules specified in block 12 may be aggressive (less strict) in order to reduce the chip area usage, and any possible resulting rule conflict may be fixed by double patterning engine 15. Double patterning engine 15 may be embodied on a non-transitory computer-readable medium 17, which may be a hard disk, for example. Double patterning engine 15 also includes program code, which may be executed by router framework 1 to perform the functions as in embodiments. In some embodiments, router framework 1 may be a computer, a computer system, a computer network, or another electronic data automation system.

Figure 2:
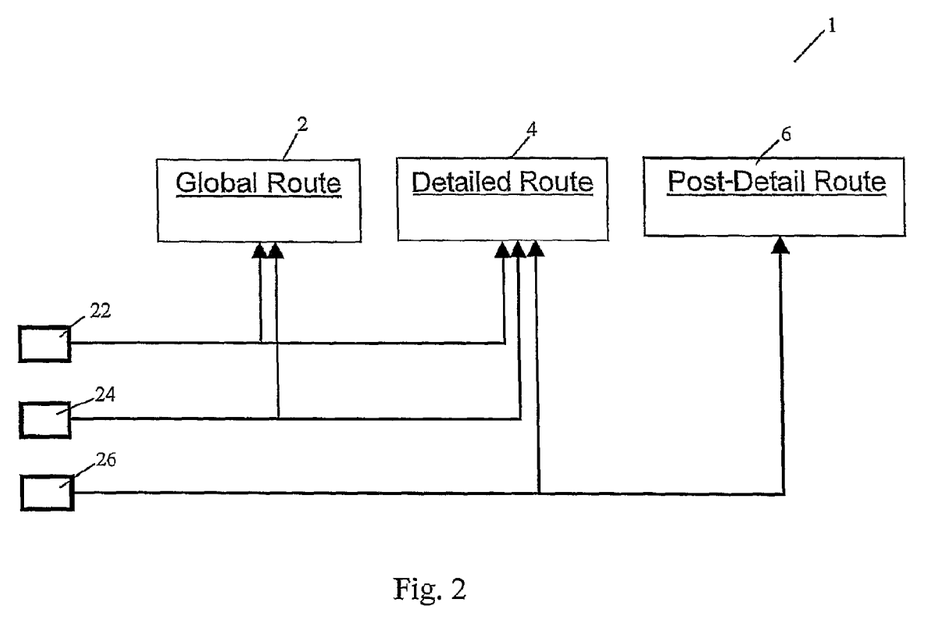
FIG. 2 illustrates interactions between the router framework and various design rules.

The interaction between the design rules and the operation of router framework 1 may be explained using FIG. 2. In global route 2 and detailed route 4, router framework 1 uses high-density-driven rules (block 22), in which the aggressive design rules are used in order to save chip area. However, this will potentially result in rule violations and the occurrence of hot spots. Accordingly, a unified double patterning engine 15 (not shown in FIG. 2, please refer to FIG. 1), which uses double patterning lithography models (not shown in FIG. 2, please refer to FIG. 1), may be used to fix any double patterning related design-rule violations (block 26). The calling of the double patterning engine may be performed using an on-the-fly style, wherein before routing each of the metal lines in a metal layer, the double patterning engine may be called. To improve the performance, the results generated by double patterning engine 15 may be stored. For example, double patterning engine 15 may determine that some of the potential hot spots are actually not hot spots. These patterns may then be stored in a library. Later, if any such pattern is found, router framework 1 will know that these patterns are not hot spots, and will not call double patterning engine 15 to determine and fix hot spots for the pattern. Optionally, layout pattern matching (block) 24 may be performed to find these patterns by matching layout patterns with the patterns stored in the library.

Figure 3:
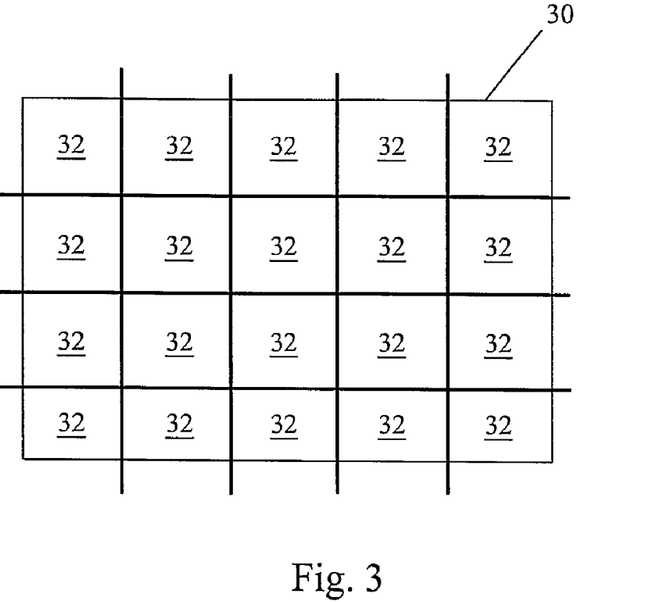
FIG. 3 illustrates a chip divided into a grid, wherein a metal layer is to be laid out for the chip.

FIG. 3 illustrates an embodiment for implementing the double patterning engine 15 as shown in FIG. 1, wherein the following discussed functions regarding FIGS. 3, 5, 6, and 7 may be part of the functions of the double patterning engine 15. Chip 30 is first provided, on which metal lines of a metal layer are to be laid out. In an embodiment, chip 30 is divided into a grid including grid cells 32, and the metal line routing is performed using a divide-and-conquer method. In an embodiment, all grid cells have substantially the same size or even an identical size, although the dimensions of grid cells 32 may also be different from row to row, and/or from column to column. The dimensions of grid cells 32 need to be integer times of a manufacturing grid (not shown), and integer times of a routing pitch (not shown), which is the minimum allowable pitch of metal lines. Further, the grid lines need to fall on manufacturing grid lines.

Figure 4:
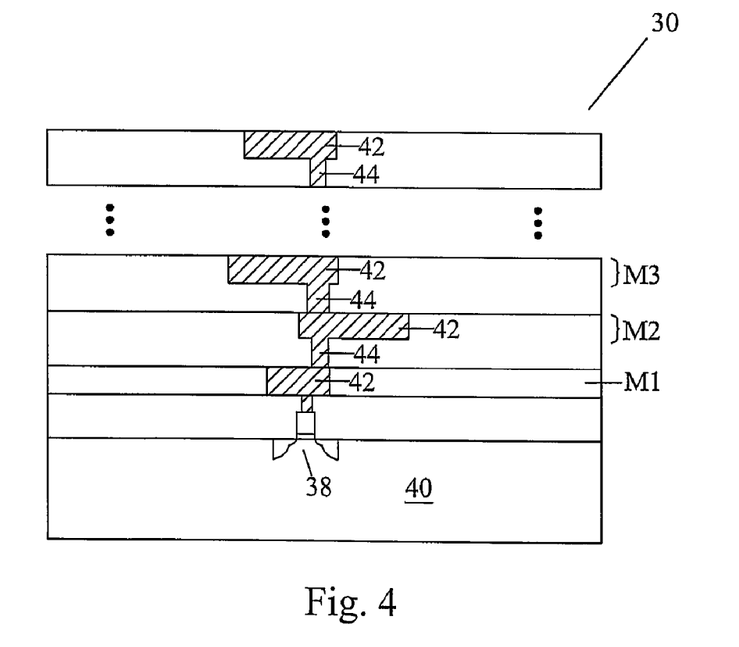
FIG. 4 illustrates a cross-sectional view of metal layers of a chip.

FIG. 4 illustrates a cross-sectional view of chip 30, on which the embodiments of the present invention may be performed. Chip 30 may include semiconductor substrate 40, and integrated circuit devices 38 (illustrated using transistor 38) at a surface of substrate 40. Over integrated circuit devices 38 reside metal layers, which include the bottom metal layer (M1), and overlying metal layers M2, M3 . . . and the like. Metal lines 42 are in the metal layers and are interconnected through vias 44. In the following discussion, the term "metal layer" may refer to any one of bottom metal layer M1 and the overlying metal layers.

Figure 5:
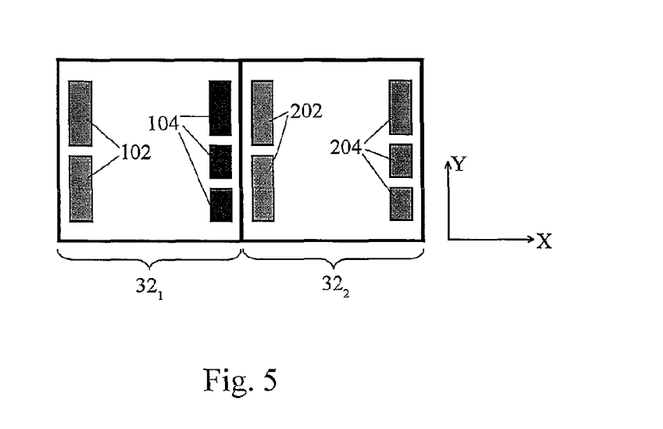
FIG. 5 illustrates an embodiment, wherein patterns in grid cells are laid out using a uni-color scheme.

FIG. 5 illustrates an embodiment, which includes two of the grid cells 32 (denoted as $32_1$ and $32_2$) abutting each other. Throughout the description, the patterns of metal lines in a grid cell and immediately adjacent to the right boundary of the grid cell are referred to as right boundary patterns (or R-patterns), and the patterns in the grid cell and immediately adjacent to the left boundary of the grid cell are referred to as left-boundary patterns (or L-patterns). In an embodiment, all R-patterns have an identical, or substantially a same, distance from the right boundary of the respective grid cell, while all L-patterns have an identical, or substantially a same, distance from the left boundary of the respective grid cell, although the distance may also be slightly different from pattern to pattern. It is assumed that through careful layout design, the metal lines inside any of grid cells 32 do not violate any design rules by themselves, and are conflict free when the patterns of the metal lines are decomposed into two or more masks of a same double patterning mask set. However, the L-patterns and R-patterns inside the grid cells 32 are potential candidates that can cause rule violations between each other.

In an embodiment, a double patterning issue can be treated as a "coloring" issue, and the corresponding scheme is referred to as a uni-color scheme. The patterns inside a grid cell can be assigned two different colors: a first color and a second color. The patterns of the metal lines having the first color (referred to as being in a first pattern set) will be transferred into a first mask, while the patterns of the metal lines having the second color (referred to as being a second pattern set) will be transferred into a second mask. The first and the second masks are lithography masks having transparent patterns allowing light to pass, and opaque portions for blocking the light. The first mask and the second mask in combination form the double patterning mask set. Referring to FIG. 5, in the layout design of grid cells $32_1$ and $32_2$, care is taken so that all of the R-patterns in each of the grid cells $32_1$ and $32_2$ have a same color (in other words, in a same pattern set and will be transferred into a same mask), and hence the R-patterns are uni-color patterns, wherein the uni-color may either be the first color or the second color. Similarly, all of the L-patterns in each of grid cells $32_1$ and $32_2$ have a same color (in other words, in a same pattern set and will be transferred into a same mask), and hence the L-patterns are also uni-color patterns. For example, patterns 102 are uni-color patterns, patterns 104 are uni-color patterns, patterns 202 are uni-color patterns, and patterns 204 are also uni-color patterns. In FIG. 5, the different colors are indicated using different shadings. For simplicity, the non-boundary patterns between the R-patterns and the L-patterns in each of grid cells $32_1$ and $32_2$ are not shown, wherein the non-boundary patterns of metal lines may have any of the first and the second colors, and most likely have a combination of the first and the second colors. There is no constraint on the coloring relationship between the R-patterns and the L-patterns in a same grid cell. The R-patterns and the L-patterns in a grid cell can both have the first color, or both have the second color. Alternatively, R-patterns and L-patterns may have different colors. In addition, the color of any of the grid cells may be inverted. For example, in grid cell $32_1$, L-patterns 102 have the first color, while R-patterns 104 have the second color. However, the colors of grid cell $32_1$ may be inverted so that L-patterns 102 have the second color, while R-patterns 104 have the first color. When the colors of L-patterns 102 and R-patterns 104 are inverted, the colors of non-boundary patterns are also inverted. In other words, in the inversion of the colors, all of the patterns in the grid cells and that originally would have been placed in the first mask/pattern-set, are switched into the second mask/pattern-set, while all of the patterns that originally would have been placed in the second mask/pattern-set are switched into the first mask/pattern-set. The inversion of the colors in grid cells may be performed at a propagation time, during which the color changes may be performed to all grid cells in a row, or the grid cells in a chip, if needed. The details are discussed in subsequent paragraphs.

With the uni-color R-patterns and L-patterns, the patterns in grid cells $32_1$ and $32_2$ may be laid out aggressively, so that they are very close to the respective boundaries. The uni-color R-patterns and L-patterns make it possible to put the R-patterns 104 in grid cell $32_1$ and L-patterns 202 in grid cell $32_2$ in two different masks. Accordingly, even if they are close to each other, no optical proximity effect will occur.

Figure 6:
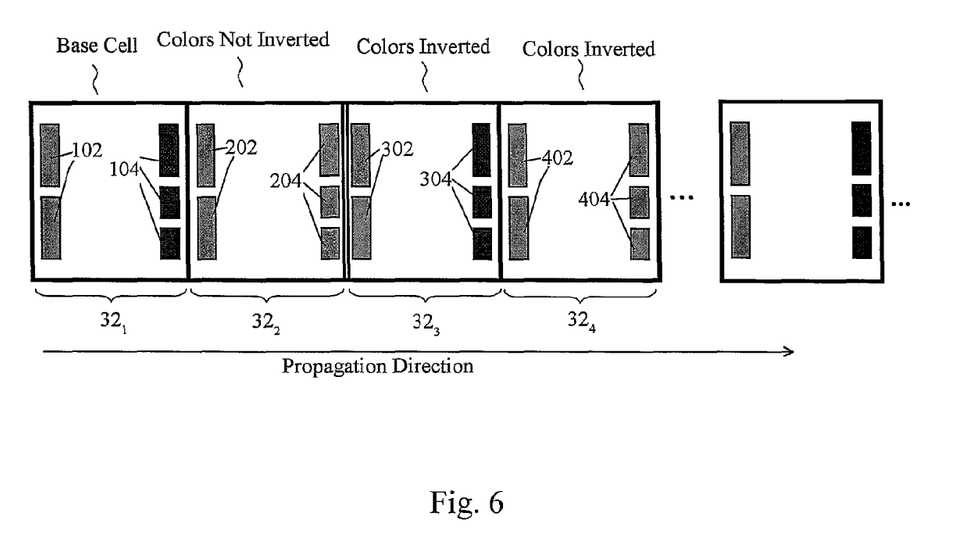
FIG. 6 illustrates how the uni-color scheme is used to solve conflicts in a row of abutted grid cells.

Problems arise between neighboring grid cells in a same row since the R-patterns of a grid cell may have a same color as the L-patterns of another grid cell on its right side. A color propagation may thus be performed to ensure that all R-patterns in any grid cell in the row have a different color than the color of the L-patterns in the abutted grid cell on its right side, and all L-patterns in any grid cell in the row have a different color than the R-patterns in the abutted grid cell on its left side. The color propagation may be performed as follows. First, any grid cell in the row may be selected as a base grid cell, and the colors of the patterns in other grid cells are determined and propagated one-by-one from the grid cells closer to the base grid cell to the grid cells farther away from the base grid cell. The color determination of each of the grid cells is based on the colors of the abutting grid cell that has just been determined/changed. For example, referring to FIG. 6, assuming grid cell $32_1$ is the base grid cell, the colors of grid cell $32_2$ are determined based on the color of R-patterns 104 in grid cell $32_1$. If the color of L-patterns 202 is different from the color of R-patterns 104 in grid cell $32_1$, the colors of the patterns in grid cell $32_1$ are not inverted. Conversely, if the color of L-patterns 202 is the same as the color of R-patterns 104, the colors of the patterns in grid cell $32_2$ are inverted, with the patterns having the first color being changed to the second color, and the patterns having the second color being changed to the first color. In an exemplary embodiment as shown in FIG. 6, the colors of grid cell $32_2$ are not inverted. The colors of grid cell $32_3$ are then determined based on the color of the R-patterns 204 in grid cell $32_2$ using a similar method as determining the colors of grid cell $32_2$. In the illustrated embodiment, the colors of grid cell $32_3$ need to be inverted. Accordingly, due to the color inversion of grid cell $32_3$, the color of L-patterns 402 becomes the same as the color of R-patterns 304, and hence the colors of grid cell $32_4$ also need to be inverted. The color propagation may be performed all the way throughout the row in the propagation direction(s).

The base grid cell may be selected from any grid cell in the row, and the color propagation may be performed to the right, to the left, or to both the right and left. Using this method, rule violation will not occur to any of the abutted grid cells in a row, and will not occur to any row in the chip when the propagate of color changes are performed to all rows in the chip. After the color propagation, masks may be formed, wherein the patterns in the first pattern set are transferred to the first mask of the double patterning mask set, while the patterns in the second pattern set are transferred to the second mask of the double patterning mask set. The double patterning mask set is for only one metal layer, while other metal layers need separate double patterning mask sets, which can also be formed using the methods discussed in the preceding paragraphs.

Figure 7:
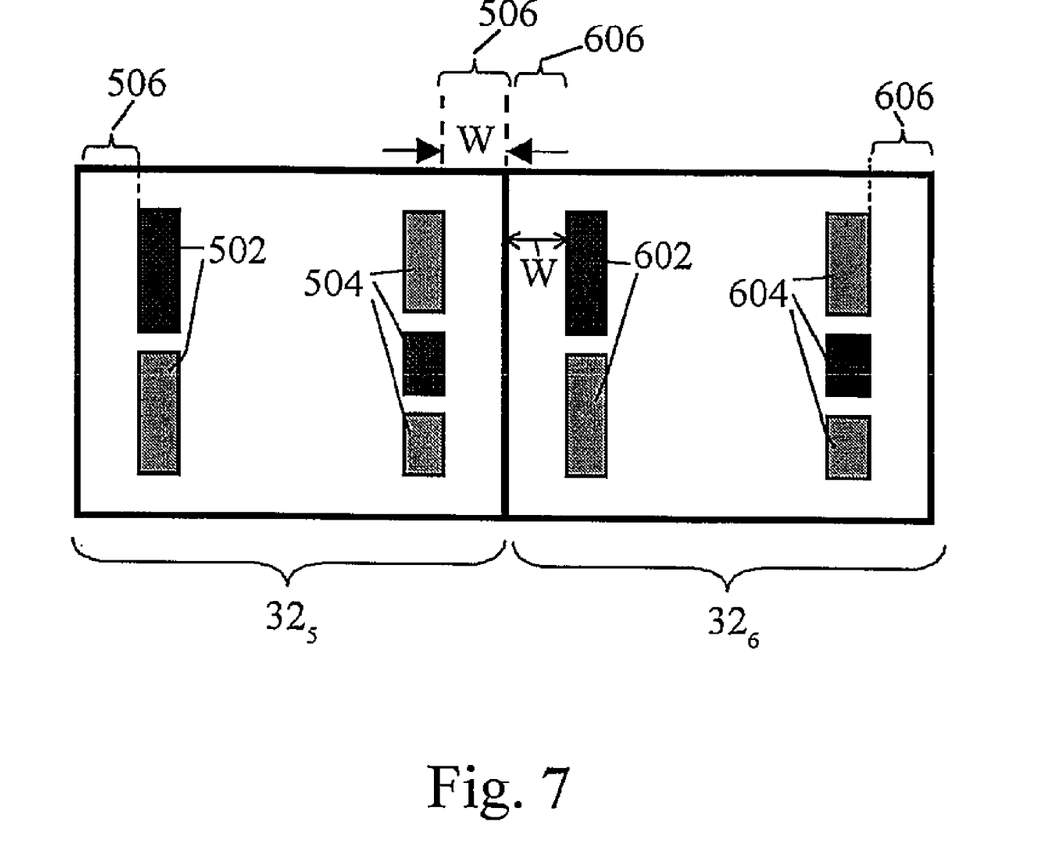
FIG. 7 illustrates an alternative embodiment, wherein buffer zones are added to solve the conflicts that may occur between abutted grid cells.

In alternative embodiments, as shown in FIG. 7, instead of using the uni-color scheme, buffer zones 506 may be inserted to space L-patterns 502 and R-patterns 504 apart from the left and right boundaries of grid cell $32_5$, respectively. Similarly, buffer zones 606 may be inserted to space L-patterns 602 and R-patterns 604 apart from the left and right boundaries of grid cell $32_6$, respectively. The width W of buffer zones 506 and 606 is great enough to ensure that even if patterns 504 and 602 have the same color (in a same mask), no rule violation will occur. In an embodiment, all of the grid cells in a chip have buffer zones; it can thus be ensured that when the grid cells are abutted, no rule violation will occur regardless of the colors of the boundary patterns of the grid cells. In other embodiments, the grid cells having the buffer zones may be integrated with the grid cells designed using the uni-color scheme. In the embodiment shown in FIG. 7, L-patterns 502 and 602 and right patterns 504 and 604 may be uni-color patterns, or dual-color patterns.

It is noted that the desirable size of grid cells may be determined by the designer, and hence the grids are variable grids that can vary from circuit to circuit. The number of grid cells affects the performance of the double patterning engine. The number of grid cells cannot be too small. Otherwise, each of the grid cells will be close to a full chip, and the benefit of divide-and-conquer is sacrificed. However, the number of grid cells is preferably not too big because too many grid cells may also cause layout difficulty and the reduction in the performance of the double patterning engine. The size of the grid cells 32 (refer to FIG. 3) may be determined by designers, and provided to the double patterning engine to divide chips.

In an embodiment, for laying out all of the metal layers of a same chip, a same grid may be used. In alternative embodiments, different metal layers may have their own grids different from the grids of other metal layers. For example, upper metal layers with wider metal lines and lower metal-line-densities may have greater grid cell sizes than lower metal layers.

In the embodiments discussed in the preceding paragraphs, the abutting of grid cells in a row is discussed, and hence the colors of left and right patterns are discussed. One skilled in the art will realize that row direction and column direction are interchangeable concepts, depending on the orientation from which the chip is viewed. Accordingly, the concept regarding the rows may also be applied to the columns of grid cells, with the top-boundary patterns and bottom-boundary patterns corresponding to left-boundary patterns and right-boundary patterns of the rows. It is noted that each of the metal layers may have a preferred metal line direction, and the colors of the metal line patterns are preferably designed to fit the preferred metal line direction. Accordingly, the color propagation only needs to be performed in one of the column and row directions. For example, in FIG. 5, the preferred metal line direction is Y direction. Accordingly, left-boundary patterns and right-boundary patterns need to have uni-colors. If, however, the preferred metal line direction is X direction, the top-boundary patterns and bottom-boundary patterns need to have uni-colors. In addition, alternating metal layers have alternating preferred metal line directions, and hence in alternating metal layers, color propagation is performed in row directions and column directions in an alternating pattern. For example, the preferred metal line direction of the layer as shown in FIGS. 5 is Y direction, and hence the preferred metal line directions of the metal layers immediately overlying and underlying the illustrated metal layer as shown in FIG. 5 are X direction.

Although the embodiments of the present invention use the term "color" to indicate which patterns will be decomposed to which of the two masks, any other indicators that can achieve the same function may also be used, and are in the scope of the present invention. These indicators include, but are not limited to, different shadings, different representing reference numerals, different gray levels, and the like, and hence the term "color" may be interpreted as covering these indicators. Further, if the double patterning mask set includes three or more masks, the concept discussed in the preceding paragraphs may also apply, with three or more different colors used.

The embodiments have several advantageous features. By using the router framework including the double patterning engine, the routing of metal lines may be solved at a smaller scale using the divide-and-conquer method. Since the grid cells are smaller than full chips, it is much easier to route metal lines inside each of the grid cells. By using the uni-color scheme or adding buffer zones, rule violation will not occur between grid cells. Therefore, as long as no rule violation occurs inside the grid cells, it is guaranteed that no double patterning rule violation will occur between grid cells.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In addition, each claim constitutes a separate embodiment, and the combination of various claims and embodiments are within the scope of the invention.

What is claimed is:

1. A method of designing a double patterning mask set for a chip, the method comprising:
    designating a first pattern set;
    designating a second pattern set;
    dividing a metal layer of the chip into a grid;
    laying out metal line patterns for the metal layer of the chip, wherein all left-boundary metal line patterns in a first grid cell of the grid are in a same one of the first pattern set and the second pattern set, and all right-boundary metal line patterns in the first grid cell are in an additional same one of the first pattern set and the second pattern set;
    switching by a computer the left-boundary metal line patterns to a different pattern set in the first pattern set and the second pattern set;
    switching by a computer the right-boundary metal line patterns to an additional different pattern set in the first pattern set and the second pattern set;
    forming a first mask of the double patterning mask set, wherein patterns in the first pattern set are formed on the first mask; and
    forming a second mask of the double patterning mask set, wherein patterns in the second pattern set are formed on the second mask.

2. The method of claim 1, wherein all grid cells in the grid have identical dimensions.

3. The method of claim 1, wherein the grid further comprises a second grid cell adjoining the first grid cell with a left boundary of the second grid cell abutting a right boundary of the first grid cell, and wherein the right-boundary metal line patterns of the first grid cell are in a different one of the first pattern set and the second pattern set than additional left-boundary metal line patterns of the second grid cell, and wherein the method further comprises:
    switching the additional left-boundary metal line patterns of the second grid cell to a different one of the first pattern set and the second pattern set; and
    switching additional right-boundary metal line patterns of the second grid cell to a different one of the first pattern set and the second pattern set.

4. The method of claim 1, wherein the grid further comprises a second grid cell with a left boundary of the second grid cell abutting a right boundary of the first grid cell, wherein the right-boundary metal line patterns of the first grid cell are in a different one of the first pattern set and the second pattern set than additional left-boundary metal line patterns of the second grid cell, and wherein the additional left-boundary metal line patterns and additional right-boundary metal line patterns of the second grid cell are not switched to different ones of the first pattern set and the second pattern set before the step of transferring the patterns in the first pattern set and the step of transferring the patterns in the second pattern set.

5. The method of claim 1, wherein the grid further comprises an additional grid cell, wherein the additional grid cell comprises a left buffer zone and a right buffer zone, and wherein left-boundary metal line patterns or right-boundary metal line patterns are laid out in both the first pattern set and the second pattern set.

6. The method of claim 1, wherein in all grid cells in the grid, all left-boundary metal line patterns in each grid cell of the grid are in a same one of the first pattern set and the second pattern set, and wherein all right-boundary metal line patterns in each grid cell of the grid are in a same one of the first pattern set and the second pattern set.

7. A method of designing a double patterning mask set for a chip, the method comprising:
    dividing the chip into a grid comprising grid cells, wherein each of the grid cells comprises a left boundary and a right boundary;
    laying out a metal layer of the chip, wherein in each of the grid cells, all left-boundary patterns of the metal layer are assigned with a first one of a first indicator and a second indicator, and all right-boundary patterns of the metal layer are assigned with a second one of the first indicator and the second indicator, and wherein the first indicator is different from the second indicator;
    starting from one of the grid cells in a row, propagating indicator changes to the grid cells in the row; and transferring all patterns in the grid cells to the double patterning mask set, with all patterns assigned to the first indicator being transferred to a first mask of the double patterning mask set, and all patterns assigned to the second indicator being transferred to a second mask of the double patterning mask set.

8. The method of claim 7, wherein the first indicator is a first color and the second indicator is a second color.

9. The method of claim 8, wherein all abutted grid cells in all rows of the grid cells have uni-indicator left-boundary patterns and uni-indicator right boundary patterns.

10. The method of claim 7, wherein all abutted grid cells in the row have uni-indicator left-boundary patterns and uni-indicator right boundary patterns.

11. The method of claim 7, wherein after the step of propagating indicator changes, in the row, all right-boundary patterns of any grid cell in the row are assigned with a different indicator than left-boundary patterns of an additional grid cell on a right side and abutting the any grid cell.

12. The method of claim 7, wherein the grid cells comprise a relaxed-rule grid cell, wherein the relaxed-rule grid cell comprises a left buffer zone and a right buffer zone, and wherein patterns selected from the group consisting essentially of left-boundary patterns and right-boundary patterns of the relaxed-rule grid cell do not have a uni-indicator.

13. The method of claim 7, wherein the chip comprises an additional metal layer, wherein all top-boundary patterns of any of the grid cells in the additional metal layer are assigned with a first one of the first indicator and the second indicator, and all bottom-boundary patterns of the any of the grid cells in the additional metal layer are assigned with a second one of the first indicator and the second indicator.

14. The method of claim 13, wherein the metal layer and the additional metal layer are immediately neighboring each other.

15. A method of designing a double patterning mask set for a chip, the method comprising:
dividing the chip into a grid comprising grid cells, wherein each of the grid cells comprises a left boundary and a right boundary;
laying out metal line patterns by a computer for a metal layer of the chip, wherein in each of the grid cells, all left-boundary metal line patterns in each of the grid cells are in a same one of a first pattern set and a second pattern set, and all right-boundary metal line patterns in the each of the grid cells are in an additional same one of the first pattern set and the second pattern set;
forming a first mask of the double patterning mask set wherein patterns in the first pattern set are formed on the first mask; and
forming a second mask of the double patterning mask set, wherein patterns in the second pattern set are formed on the second mask.

16. The method of claim 15, wherein the step of laying out metal line patterns comprises, starting from one of the grid cells in a row, propagating pattern set changes to all remaining ones of the grid cells in the row.

17. The method of claim 16, wherein after the step of propagating pattern set changes, in the row, all of the right-boundary metal line patterns in any grid cell in the row are in a different one of the first pattern set and the second pattern set than all of the left-boundary metal line patterns of an additional grid cell on a right side and abutting the any grid cell.

18. The method of claim 15, wherein the grid cells comprise a relaxed-rule grid cell, wherein the relaxed-rule grid cell comprises a left buffer zone and a right buffer zone, and wherein patterns selected from the group consisting essentially of left-boundary patterns and right-boundary patterns of the relaxed-rule grid cell are not in a same one of the first pattern set and the second pattern set.

19. The method of claim 15, further comprising:
performing a global route of metal line patterns for the chip;
performing a detailed route of metal line patterns for the chip; and
performing a post-detail route of metal line patterns for the chip, wherein each of the steps of performing the detailed route and performing the post-detail route comprises the step of laying out the metal line patterns for the metal layer of the chip.

20. A router framework for routing metal lines for a chip, the router framework comprising:
a non-transitory computer-readable medium comprising a double patterning engine, which when executed by a computer, performs steps of:
laying out metal line patterns for a metal layer of the chip, wherein the metal layer is divided into grid cells comprising a first grid cell, and wherein all left-boundary metal line patterns in the first grid cell are in a same one of a first pattern set and a second pattern set, and all right-boundary metal line patterns in the first grid cell are in a same one of the first pattern set and the second pattern set;
switching the all left-boundary metal line patterns in the first grid cell to a different pattern set in the first pattern set and the second pattern set; and
switching the all right-boundary metal line patterns in the first grid cell to a different pattern set in the first pattern set and the second pattern set.

21. The router framework of claim 20, wherein the double patterning engine is further executed to, starting from one of the grid cells in a row, propagate pattern set changes to all remaining ones of the grid cells in the row.

22. The router framework of claim 21, wherein the double patterning engine is further executed to ensure that none of the grid cells laid out by the double patterning engine comprises a third left-boundary metal line pattern in the first pattern set and a fourth left-boundary metal line pattern in the second pattern set, or a third right-boundary metal line pattern in the first pattern set and a fourth right-boundary metal line pattern in the second pattern set.

23. The router framework of claim 22, wherein the double patterning engine is further executed to ensure that none of the grid cells in any row in the chip and laid out by the double patterning engine comprises a first left-boundary metal line pattern in the first pattern set and a second left-boundary metal line pattern in the second pattern set, and a first right-boundary metal line pattern in the first pattern set and a second right-boundary metal line pattern in the second pattern set.

24. The router framework of claim 20, wherein the double patterning engine is further configured to ensure that the grid cells laid out by the double patterning engine comprise a relaxed-rule grid cell comprise a left buffer zone and a right buffer zone, and wherein patterns selected from the group consisting essentially of all left-boundary metal line patterns and all right-boundary metal line patterns in the relaxed-rule grid cell are not in a same one of the first pattern set and the second pattern set.

25. The router framework of claim 20, further comprising a detailed routing unit, wherein the detailed routing unit is configured to call the double patterning engine to layout the metal line patterns for the metal layer.

26. The router framework of claim 20, further comprising a post-detail routing unit, wherein the post-detail routing unit is configured to call the double patterning engine to fix rule violations in a layout of the metal layer.

27. The router framework of claim 20, further comprising a global routing unit.

28. The router framework of claim 20, further comprising a database connected to the double patterning engine, wherein the database is configured to store the left-boundary metal line patterns and the right-boundary metal line patterns received from the double patterning engine.

* * * * *